(12) United States Patent
Liebich et al.

(10) Patent No.: US 9,575,210 B2
(45) Date of Patent: Feb. 21, 2017

(54) DOWNPIPE SENSOR SYSTEM AND METHOD FOR SINGLE GRAIN RECOGNITION

(71) Applicant: MUELLER-ELEKTRONIK GMBH & CO. KG, Salzkotten (DE)

(72) Inventors: Martin Liebich, Breitenbach (DE); Jens Klocke, Salzkotten (DE); Paulo Martella, Salzkotten (DE)

(73) Assignee: Mueller-Elektronik GmbH & Co. KG, Salzkotten (DE)

( * ) Notice: Subject to any disclaimer, the term of this patent is extended or adjusted under 35 U.S.C. 154(b) by 0 days.

(21) Appl. No.: 14/683,350

(22) Filed: Apr. 10, 2015

(65) Prior Publication Data

US 2015/0293257 A1 Oct. 15, 2015

(30) Foreign Application Priority Data

Apr. 10, 2014 (EP) ..................................... 14164296

(51) Int. Cl.
*G06F 7/70* (2006.01)
*G01V 8/22* (2006.01)
(Continued)

(52) U.S. Cl.
CPC ................. *G01V 8/22* (2013.01); *A01C 7/105* (2013.01); *A01C 21/00* (2013.01); *G01J 1/0271* (2013.01);
(Continued)

(58) Field of Classification Search
CPC .................. G01J 1/02; G01J 1/04; G01J 1/42; G01J 1/0477; G01J 1/0437; G01J 1/0271; G01V 8/22; A01C 21/00
(Continued)

(56) References Cited

U.S. PATENT DOCUMENTS 5,936,234 A    8/1999 Thomas et al.
6,093,926 A *  7/2000 Mertins .................. A01C 7/105
                                                 250/222.1
(Continued)

FOREIGN PATENT DOCUMENTS

DE       260764 A1    10/1988
EP      1148352 A2    10/2001
(Continued)

*Primary Examiner* — Thomas G Black
*Assistant Examiner* — Luke Huynh
(74) *Attorney, Agent, or Firm* — Laurence A. Greenberg; Werner H. Stemer; Ralph E. Locher

(57) ABSTRACT

A downpipe sensor detects single grains in a downpipe. A transmitting unit and a receiving unit are spaced apart across a measurement field. Light beams emitted by the transmitting unit are guided in the case of free beam path through the downpipe interior to the receiving unit and are attenuated during a passage of a grain. The receiving unit is a line element with a predefined number of receiving elements. The transmitting unit has light-emitting diodes with perforated screens and a reflector element in the form of a right triangular prism. Light is emitted from the diodes transversely to a receiving axis of the receiving unit, bundled via the perforated screens, guided into the reflector element, deflected by total reflection toward a exit surface to form a light band of parallel light beams. The light band illuminates the entire measurement field with even intensity.

21 Claims, 7 Drawing Sheets

(51) Int. Cl.
*A01C 7/10* (2006.01)
*G01V 8/20* (2006.01)
*A01C 21/00* (2006.01)
*G01J 1/02* (2006.01)
*G01J 1/04* (2006.01)
*G01J 1/42* (2006.01)

(52) U.S. Cl.
CPC ............ *G01J 1/0437* (2013.01); *G01J 1/0477* (2013.01); *G01J 1/42* (2013.01); *G01V 8/20* (2013.01); *G01J 2001/0276* (2013.01)

(58) Field of Classification Search
USPC .... 701/50; 250/221, 222.1, 222.2; 337/6, 53
See application file for complete search history.

(56) References Cited

U.S. PATENT DOCUMENTS

| | | | |
|---|---|---|---|
| 8,022,353 B2 | 9/2011 | Leuenberger et al. | |
| 8,618,465 B2 * | 12/2013 | Tevs | G01V 8/20 111/200 |
| 8,669,514 B2 * | 3/2014 | Kjartanson | G06M 1/101 250/221 |
| 8,767,214 B2 * | 7/2014 | Romanin | G01F 1/661 356/442 |

FOREIGN PATENT DOCUMENTS

| | | |
|---|---|---|
| EP | 1726200 A1 | 11/2006 |
| EP | 1779714 A1 | 5/2007 |
| WO | 2006087176 A1 | 8/2006 |

\* cited by examiner

DOWNPIPE SENSOR SYSTEM AND METHOD FOR SINGLE GRAIN RECOGNITION

CROSS-REFERENCE TO RELATED APPLICATION

This application claims the priority, under 35 U.S.C. §119, of European patent application EP 14 164 296.7, filed Apr. 10, 2014; the prior application is herewith incorporated by reference in its entirety.

BACKGROUND OF THE INVENTION

Field of the Invention

The invention relates to a downpipe sensor for single grain recognition of grains in a downpipe having a predefined measurement field, on which a transmitting unit and a receiving unit are arranged at a distance to one another, wherein the light beams emitted by the transmitting unit are guided through the downpipe interior to the receiving unit in the case of a free beam path and are at least partially attenuated during a passage of a grain, and in which the receiving unit is formed by a line element having a predefined number of receiving elements, and also the method thereof for single grain recognition and the use thereof in agricultural machines.

Single seeding is used in crops, the seeds of which are costly, and the yield of which is dependent on the uniform plant spacing on the field. The air seeder firstly draws a furrow in the seedbed using the coulter, the seed supply is performed individually for each seed, however. In this case, with the aid of an isolation assembly, the seeds are delivered individually through the downpipe to the furrow. The air seeder is variably usable for sowing, for example, corn, sunflowers, wheat, soybeans, beets, and various other seeds, wherein currently high sowing speeds and very good isolation values are achieved. With the aid of pneumatic or mechanical regulating systems (i.e., closed-loop control systems), individual seed grains are deposited with centimeter precision at a previously definable spacing in the furrow. To optimize and monitor the sowing result, the isolation quality is continuously monitored by sensors on the downpipe. In this case, the total quantity of the discharged grains is especially monitored for correspondence with the specifications of the machine operator. The time interval between the individual falling seeds is sometimes also measured and the variation coefficient and the numbers of gaps and double occupancy are ascertained therefrom. The transmission of these items of information is performed from each individual sensor to the higher-order computing unit of the air seeder. Quality parameters are provided for each individual seed row therein, which are displayed to a machine operator via a display screen, on the one hand, and are processed to form overall quality parameters, on the other hand, which makes it possible for the machine operator to immediately influence the depositing quality, for example, by adapting the driving speed or changing the settings on the seeder. Current sensors operate with one or more light detectors according to the light barrier principle. As a result, usually only large grains such as corn or soybeans can be detected. In addition, these sensors have problems in the recognition of double seeds and sometimes also detect dirt, which falls through the downpipe and corrupts the count result in this case.

European Patent EP 1 148 352 B1 describes an optical sensor having a transmitter and a receiver arranged at a distance thereto, in which the receiver is a line element having a plurality of receiving elements. In this case, the transmission light beams emitted by the transmitter are focused on the receiving elements so that the beam width of the transmitted light beams decreases continuously transversely to the longitudinal axis of the line element from the transmitter toward the receiver, so that the beam width of the transmitted light beams corresponds to the width of the line element on the surface of the receiver. Disadvantageously, to generate this decreasing light band, a complex arrangement of an aspheric lens having a downstream cylinder lens and a deflection mirror is required behind the transmitter, which occupies a large amount of space in the housing element of the forked light barrier. Furthermore, the recognition is essentially based on the detection of contours and/or edges of objects, which are arranged in the beam path of the transmitted light beams and therefore continuously shade a part of the receiving elements. The detection of objects briefly passing the beam path, in contrast, as is required for the detection of seed grains, is not disclosed in EP 1 148 352 B1.

U.S. Pat. No. 8,022,353 B2 and its counterpart International publication WO 2006/087176 A1 describe a device for measuring the number and frequency of the seeds in a stream of seed grains, which is made of an illumination unit having light-emitting diodes and a sensor unit which is situated opposite and has a CCD line sensor. An objective lens is required for focusing the image of a seed grain on the line sensor which is a disadvantage. Furthermore, a mirror arrangement consisting of a pair of mirrors arranged against each other in parallel is required in front of the objective lens, which expands the depth of field of the optics so that the seed grains can be sharply imaged and counted independently of the position inside the measurement opening.

European published patent application EP 1 779 714 A1 discloses a device for optical counting of small objects, which has a measurement chamber, which is formed by light transmissive and planar disks. In this case, the light emitters and light detectors of the sensors are sealed and arranged behind the light transmissive disks. A collimator lens arranged downstream from the light emitter is necessary for fanning out the light beams to the width of the measurement chamber which is a disadvantage. Overall, the device has two light detectors and light emitters offset by 90° to one another, whereby recognition and counting of the seed grains independently of the position inside the measurement chamber is made possible. This is necessary, since, in the delivery line between the storage container and a metering unit, multiple seed grains can generally pass the measurement chamber simultaneously when using the device according to the invention.

German published patent application DD 260 764 A1 describes a method for determining the grain size ratio of a grain mixture, in which the grains are guided through a parallel light band and are cyclically scanned line-by-line in rapid succession by a CCD line camera. In this case, the CCD line camera scans the light band over a matte disk, which is arranged in front of the camera, and classifies the signals into classes of different pixel lengths depending on the grain size. Single grain detection is not provided in this method.

European published patent application EP 1 726 200 A1 describes a method for determining the quality of agricultural bulk goods, the components of which, for example, seed grains of a seed drill, fall through a sensor in order to be counted. For this purpose, the sensor consists of a laser unit having an optical lens and an opposing CCD line sensor having an optical lens, and, at an angle of 90° thereto, a further laser unit having an optical lens having an associated further CCD line sensor having an optical lens, so that the light beams intersect at an angle of 90°. The location points obtained in this way are added up in an analysis unit to obtain a volume dimension for the physical volume of a seed grain, from which the number of seed grains and the pure density of the bulk goods are then calculated. A one-dimensional arrangement of a laser unit having an opposite CCD line sensor is not provided in this method.

The method known from U.S. Pat. No. 6,093,926 for counting seed grains in the particle flow through a primary and/or secondary pipe of an air delivery system, for example, a seeder, comprises a radiation source having a transmitter lens body, to illuminate a detection region in the seed pipe by means of essentially uniform collimated light beams, and a light radiation detector having a receiver lens body, to monitor the number of particles flowing in the seed pipe. In this case, the radiation source and the light radiation detector are arranged remotely from the pipe and are connected by means of optical waveguides and optical connectors to the transmitter lens body or the receiver lens body for the optical transmission. A photodiode field having a current-frequency converter is integrated in the light radiation detector, whereby an interruption of the light beams is detected and is output as a pulse signal. However, it is a disadvantage that this pulse signal is independent of the position of the shading in the detection region, whereby double seed grains or foreign seed grains or dirt particles cannot be reliably recognized, so that incorrect count results occur. In addition, the arrangement of the optical waveguide and optical connectors and the embodiment of the two lens bodies are cumbersome and complex to handle. The optical waveguides are relatively sensitive to mechanical stress and are not simple to lay.

A seed drill monitoring system having fiber-optic sensors is known from U.S. Pat. No. 5,936,234, which has a master unit, to which one or more counting units are connected. Each counting unit comprises a light source and an optical unit for implementing the light beams, which pass through a detection region in the seed pipe and then enter into a light beam detector. This light beam detector is implemented as a photodiode having a large-area sensor surface. However, it is a disadvantage the photocurrent generated by the photodiode is independent of the position of the shading in the detection region, whereby double seed grains or foreign seed grains or dirt particles cannot be reliably recognized, so that incorrect count results occur. In addition, the two openings of the emitter and detector housing protrude from the interior of the seed pipe, so that an accumulation of dust and dirt particles occurs on the openings due to the air flow of the seeds, which results in further incorrect count results.

SUMMARY OF THE INVENTION

It is accordingly an object of the invention to provide a downpipe sensor and method of single grain detection which overcomes the above-mentioned and other disadvantages of the heretofore-known devices and methods of this general type and by means of which, by way of the arrangement of a transmitting unit and a receiving unit on the downpipe, different grains can be reliably recognized in the entire space inside the downpipe and grains and dirt particles are unambiguously differentiated at the same time. Furthermore, the housing parts for the illumination unit and the sensor unit are to be embodied in a compact way.

With the foregoing and other objects in view there is provided, in accordance with the invention, a downpipe sensor for single grain recognition of grains in a downpipe, the sensor comprising:

a transmitting unit and a receiving unit disposed at a spacing distance from one another and spanning a predefined measurement field in a downpipe interior, wherein light beams emitted by said transmitting unit traverse said downpipe interior to said receiving unit and the light beams are at least partially attenuated during a passage of a grain through the measurement field;

said receiving unit having a receiving axis and being formed by a line element having a predefined number of receiving elements;

said transmitting unit having one or more light-emitting diodes with perforated screens arranged in a line and a reflector element being a prism formed as a right triangle having two mutually perpendicular surfaces forming an entry surface and an exit surface, respectively, and a third surface forming a reflection surface;

wherein the light beams are emitted from said light-emitting diodes transversely to said receiving axis of said receiving unit, are bundled via said perforated screens, are subsequently guided into said reflector element via said entry surface, and are deflected by total reflection toward said exit surface via said reflection surface to form a light band of mutually parallel light beams, with said light band in said measurement field completely illuminating an entire said downpipe interior with an intensity of approximately even strength and entering said receiving unit parallel with said receiving axis thereof; and wherein an entire width of said downpipe interior and an entire width of said light band is continuously monitored via said line element during operation; and means connected to said receiving unit for recognizing areas of grains arranged in the light band.

In other words, in the downpipe sensor according to the invention, the transmitting unit comprises one or more light-emitting diodes, which are arranged in a line adjacent to one another and have perforated screens and a reflector element. In this case, a reflector element is embodied in the form of a prism as a right triangle, in which the two surfaces perpendicular to one another form an entry surface and an exit surface for the light beams emitted from the light-emitting diodes. The third surface of the prism forms a reflection surface for the light beams, which is used, according to the effect of total reflection, for the low-loss deflection of the light beams.

The light beams are emitted from the light-emitting diodes transversely to a receiving axis of the receiving unit and are bundled via the perforated screens, wherein the scattered light of the light-emitting diodes is shaded by the perforated screens and simultaneously the individual light-emitting diodes are held at a defined distance to one another in the holding devices of the perforated screens. Subsequently, the light beams are guided into the reflector element via the entry surface and are deflected by total reflection to the exit surface via its reflection surface to form a light band of light beams aligned in parallel. To achieve the highest possible degree of transmission for the entire beam path, the light beams are guided perpendicularly onto the entry surface, so that the light beams are not refracted. The advantages of this total-reflecting prism in relation to a mirror arrangement are, inter alia, the fixed location of the reflective surfaces, the compact construction, and the higher degree of transmission or lower reflection losses. Resulting from this arrangement, the light band in the measurement field completely illuminates the entire downpipe interior with intensity of approximately equal strength and enters the receiving unit in parallel to the receiving axis thereof. In this case, the entire width of the downpipe interior and therefore the light band are continuously detected via the line element of the receiving unit. This light beam guiding results in particularly high detection sensitivity of the downpipe sensor, since the entire space inside the downpipe is monitored, whereby more items of information are available than in the previously known sensors.

The combination of a light-emitting diode, perforated screen, and reflector element can advantageously be adapted by multiplication to any desired measurement field width and is therefore usable for embodiments of different sizes of downpipes. Simultaneously, the compact construction thereof and the deflection of the light beams makes it possible for the transmitting unit to be arranged, in a housing element of small dimensions, on the downpipe outer wall, without it protruding from the downpipe in this case.

In addition, the reflection surface of the reflector element has multiple convex bulges, which are each situated in front of a light-emitting diode. Due to the wall of the reflection surface being bulged in this manner, the reflected light beams are converted into parallel light beams during the total reflection. The reflector element is produced from a transparent plastic such as polymethyl methacrylate (PMMA), which is also known as acrylic glass. This material transmits the light beams better than mineral glass, is resistant to weathering and aging, and enables simple processing. Transparent plastics are used, inter alia, in light technology, for example for optical fibers, and in optometry, for example for hard contact lenses and spectacle lenses.

The downpipe sensor has two units which are separate from one another, i.e. the transmitting unit and the receiving unit. The measurement operation in this sensor is performed at a defined point of the downpipe, specifically the predefined measurement field. At this point, the downpipe has two transparent openings on its front and rear sides, in which the transmitting and receiving units are arranged on both sides on the measurement field in the first and second openings along the receiving axis. In this case, the transmitting unit is arranged in a first housing element and the receiving unit is arranged in a second housing element. The transparent openings are embodied differently in various types of downpipes. Some types of downpipes have openings, others are manufactured from a light transmissive material and are therefore closed. The housing elements for the transmitting and receiving units are universally designed to work on all types of downpipes, wherein both the mechanical and also the electrical requirements are fulfilled. In addition, the transmitting and receiving units are held on the downpipe using a fastening strap.

Since, in some types of downpipes, the transmitting and receiving units protrude directly into the downpipe interior of the measurement field, they must be protected against dust and dirt particles for protection. For this reason, the transmitting and receiving units close off the first and second opening, respectively, of the downpipe with a protective disk, wherein the protective disk is embodied as planar toward the downpipe interior, to avoid accumulations of dirt and dust particles on edges or grooves. These protective disks are manufactured from a transparent material, for example, glass having a high degree of hardness and low infrared light damping.

The light-emitting diodes of the transmitting unit generate light beams of a wavelength in the spectral range between 550 nm and 1100 nm. Advantages in this case are, for example, low damping and little scattering by dust inside the measurement field.

The receiving unit consists of an optical line sensor as a line element having a plurality of photo elements as receiving elements. In this case, the line sensor can consist of one or more PIN diodes, CCD line elements, or CMOS line elements. The line sensor has a resolution of greater than 50 dpi. Due to the high resolution, even small grains can be identified and differentiated from dirt particles. Since the line sensor is clocked at a cycle frequency of greater than 1 MHz, it is possible to generate a high scanning rate, in particular to scan small seed grains multiple times during the passage on the measurement surface in the case of a very high falling speed. The number of scans for one grain provides an inference about the speed of the grain in the downpipe.

Furthermore, means are provided for recognizing areas of grains arranged in the light band, which have at least one analysis unit for analyzing the analog reception signals arriving at the output of the receiving unit. In this case, the analysis unit comprises at least one A/D converter, which converts the analog input signal of the line sensor into digital data, which are then stored for multiple scanned lines in a memory. In addition, predefined reference values for the illumination per pixel and reference value ranges for the size of the grain are also stored in the memory. By analyzing the shaded areas and the area focal points in the stored lines on the basis of the stored reference values, the microcontroller determines the number of the recognized grains and the numbers of gaps and double occupancy, which are then output via an interface as an analysis signal. In addition, the interface is used for receiving new or changed reference values. Moreover, the analysis unit comprises a light-emitting diode driver, to adjust the current of the light-emitting diodes and therefore the intensity of the light beams.

With the above and other objects in view there is also provided, in accordance with the invention, a method for single grain recognition in a downpipe with a downpipe sensor as outlined above. The method comprises the following method steps:

(i) illuminating the measurement field by the light band of the transmitting unit;

(ii) cyclically scanning successive lines by way of the receiving unit;

(iii) delivering individual grains in the downpipe through the predefined measurement field;

(iv) interrupting the light band by way of a grain or a dirt particle; (v) storing the currently scanned line values in the memory;

(vi) analyzing the currently scanned line values to ascertain shaded points during a passage of the grain per line;

(vii) forming the center point of the shaded points per line;

(viii) ascertaining the area of shaded points over multiple lines;

(ix) evaluating the shaded area by comparing with stored reference values of the grains by way of the microcontroller;

(x) recognizing individual grains on a basis of a result of the evaluating step;

(xi) blanking out dirt particles and foreign grains; and (xii) outputting an analysis signal containing items of information about recognized grains via the interface.

In other words, the method according to the invention for single grain detection and recognition using the downpipe sensor provides that firstly the measurement field is completely and uniformly illuminated with parallel light beams by means of the light band of the transmitting unit and simultaneously the measurement field is cyclically scanned in successive lines. The grains of a product stream are conveyed, isolated by an isolation assembly, through the predefined measurement field in the downpipe. A grain or dirt particle falling through the measurement field results in an interruption of the light band and occurs as a shading on the line element of the receiving unit. These currently scanned line values are stored in the memory. By reading out the memory, the area of shaded points is determined over multiple lines and evaluated by the microcontroller by comparison to the predefined reference values of the grains. On the basis of the predefined reference values, for example, the length and width of the shaded area and the center points in the shaded area, the individual grains are recognized and it is possible to differentiate very precisely between grains and dirt particles or dust. Even if a concentration of dirt results in a certain degree of shading in relation to the level, the dirt will not be in predefined boundaries of the width or length of the shading and will also be blanked out, precisely like foreign grains are. Finally, the items of information of recognized grains are output via the interface as the analysis signal.

The items of information of the analysis signal also contain details about the time span between two successively recognized grains and/or the number of the recognized grains in a predefined time span. Accordingly, the grain density in the furrow may be monitored and also controlled.

The reference values for the illumination per pixel of the line and reference values for the length, width, and offset from center points of the shading by the grains are stored in the memory. By storing different reference values in the memory, the analysis is adjustable to seed grains of different shapes, for example, corn, sunflowers, wheat, soybeans, beets, or rapeseed. Advantageously, new or changed reference values are transmitted from an application and/or a selection of the different reference values is made via the interface.

The object of the invention is also the use of the above-described downpipe sensor in agricultural machines, which deliver agricultural materials in a product stream of grains. The downpipe sensor is preferably used in air seeders, which deposit seed grains after the isolation thereof through a downpipe for sowing at a predefined spacing in a furrow of the ground. Furthermore, this downpipe sensor is also used in pneumatic or mechanical seeders or in fertilizer distributors, which discharge granular fertilizer uniformly onto agricultural useful surfaces, for example. The downpipe sensor is particularly advantageously incorporated into a control system of the agricultural machine in this case, so that the items of information of all employed downpipe sensors can be used for monitoring and/or displaying the isolation quality. In addition, data can then be exchanged for diagnostic purposes and update operations via the interface.

Other features which are considered as characteristic for the invention are set forth in the appended claims.

Although the invention is illustrated and described herein as embodied in a downpipe sensor and method for single grain recognition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
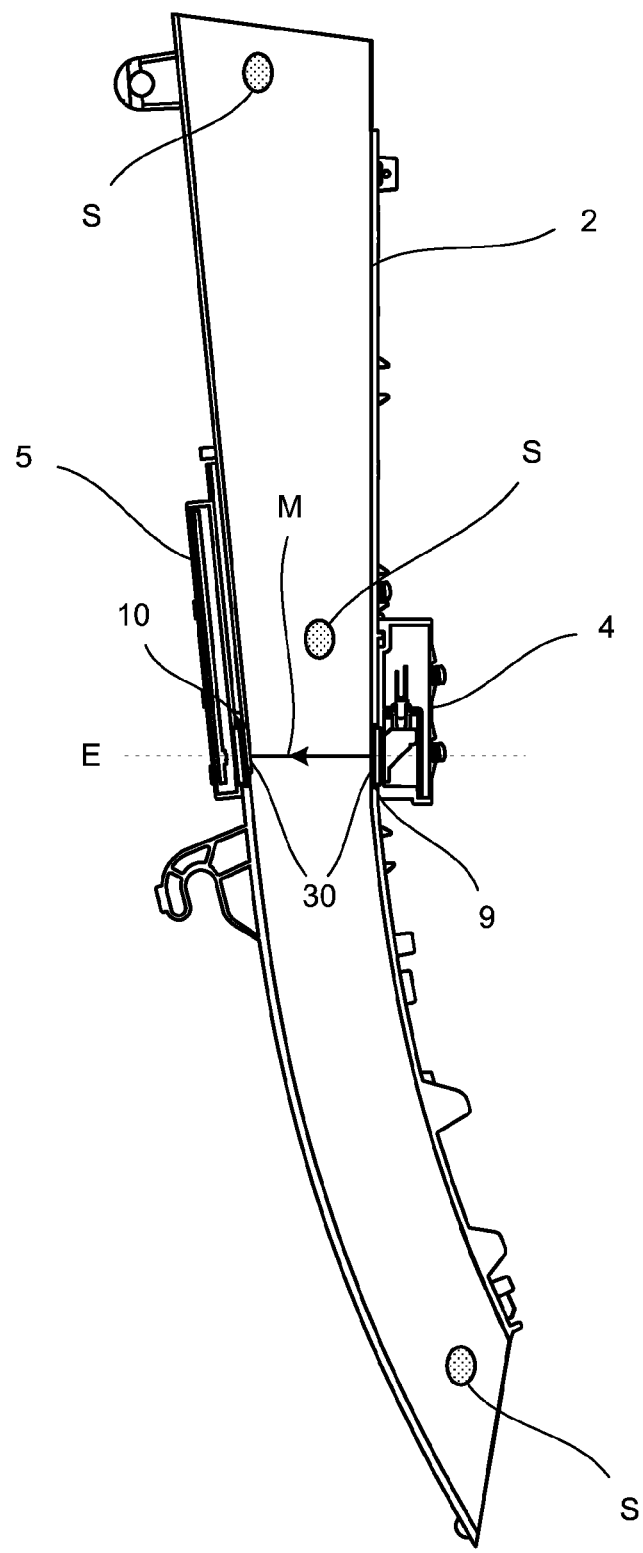
FIG. 1 is a longitudinal section of a preferred embodiment of the downpipe sensor according to the invention having transmitting and receiving units arranged on both sides on the measurement field.

Referring now to the figures of the drawing in detail and first, particularly, to FIG. 1 thereof, there is shown a sectional view of a preferred embodiment of the downpipe sensor 1 according to the invention having transmitting unit 4 and receiving unit 5 arranged on both sides on the measurement field M, together with a downpipe 2.

The transmitting unit 4 and receiving unit 5 are arranged along a receiving axis E in the first 9 and second transparent opening 10 of the downpipe 2 and close off each of them with a protective disk 30 flatly toward the downpipe interior, so that no dust can accumulate there. Isolated grains S are delivered through a predefined measurement field M in the downpipe 2, which is parallel to the receiving axis E of the receiving unit 5.

Figure 2:
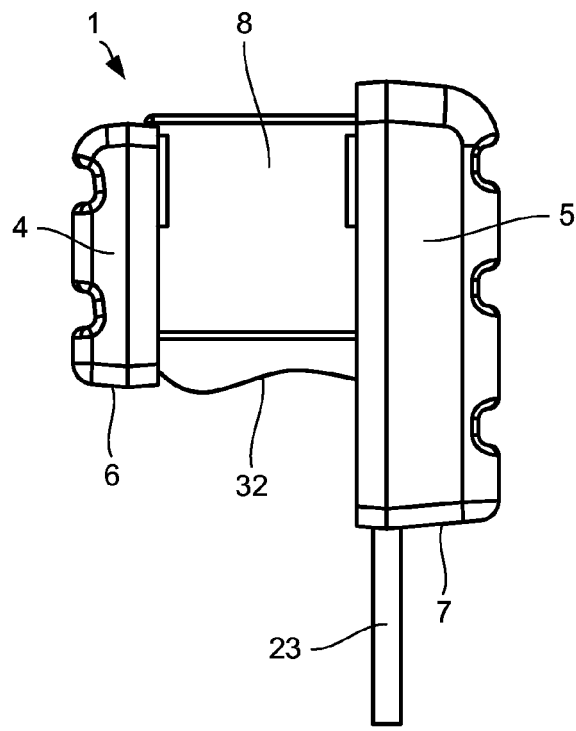
FIG. 2 shows a front view of the downpipe sensor having first and second housing elements and connecting strap.

FIG. 2 shows a front view of the downpipe sensor with a first housing element 6 and a second housing element 7 and a fastening strap 8.

On the left side, the transmitting unit 4 is arranged in the first housing element 6 and on the right side, the receiving unit 5 is arranged in the second housing element 7, wherein the housing elements 6, 7 are connected by way of a connecting strap 8 and the supply 32 for the transmitting unit 4. In addition, the receiving unit 5 comprises the interface 23.

Figure 3:
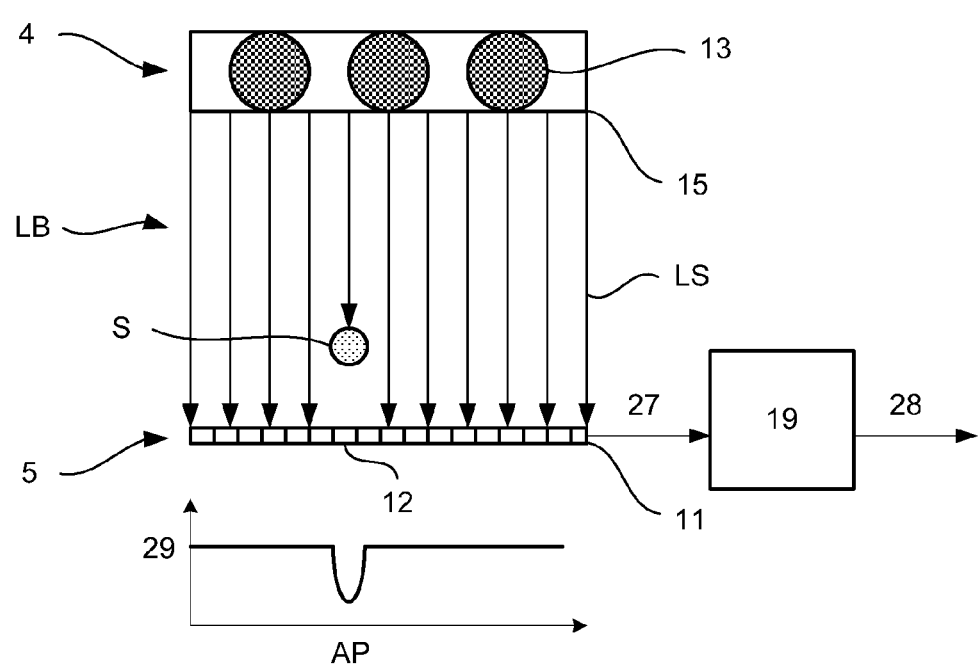
FIG. 3 shows a schematic illustration of the downpipe sensor having beam path in the measurement field.

FIG. 3 shows a schematic illustration of the downpipe sensor 1 with beam path in the measurement field M.

On the basis of the preferably three light-emitting diodes 13 and the reflector element 15 in the transmitting unit 4, a light band LB of light beams LS aligned in parallel is emitted and the line element 11 is arranged opposite thereto in the receiving unit 5, which can differentiate between the brightnesses. The measurement method provides that a grain S interrupts this light band LB and produces the shading directly on the light-sensitive receiving element 12.

The line element 11 accordingly outputs an analog reception signal 27 having a reduced saturation level 29 for the shaded points AP. This is digitized and stored in the analysis unit 19. From the sequence of the stored lines, the analysis unit 19 then obtains an image of a grain S and can decide when the shaded area AF corresponds to the stored reference value ranges and therefore results in the recognition of a single grain S. An analysis signal 28 having items of information about the recognized grain S is then output.

Figure 4:
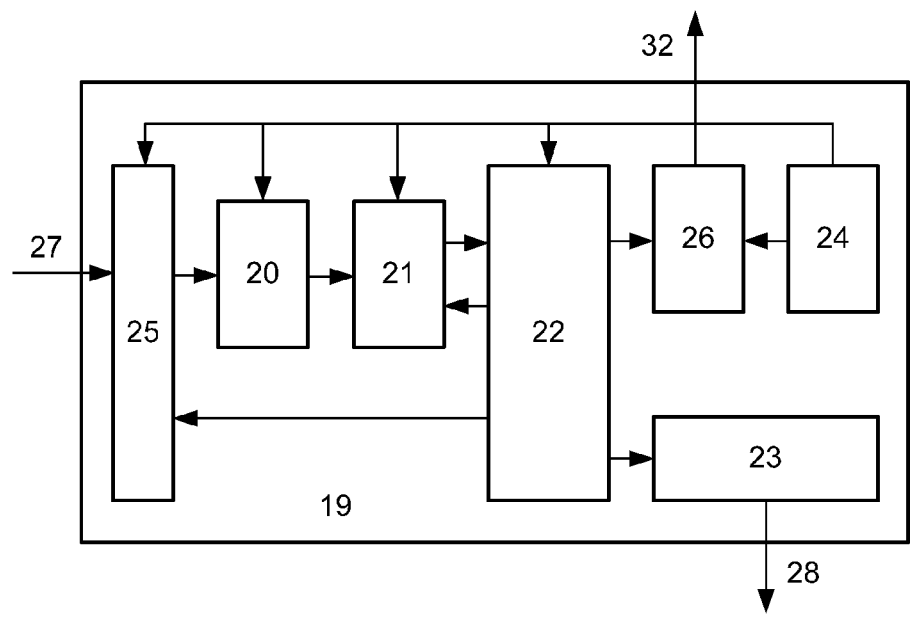
FIG. 4 shows a block diagram of the analysis unit of the downpipe sensor.

FIG. 4 shows a block diagram of the analysis unit 19 of the downpipe sensor 1.

The analysis unit 19 receives the analog reception signal 27 of the receiving unit 5 via the line element controller 25. This signal 27 is subsequently digitized by the A/D converter 20 and stored in the memory 21. With the aid of the stored digital reception signals, the microcontroller 22 determines the shaded area AF over multiple lines and evaluates the shaded area AF by comparison to the reference values of the seed grains S stored in the memory 21. As a result, the analysis signal 28 about a recognized seed grain S is output at the interface 23.

In addition, the analysis unit 19 comprises a light-emitting diode driver 26 and a supply 32 for the transmitting unit 4. The current for the light-emitting diodes 13 in the transmitting unit 4 is adjustable via the light-emitting diode driver 26.

Figure 5:
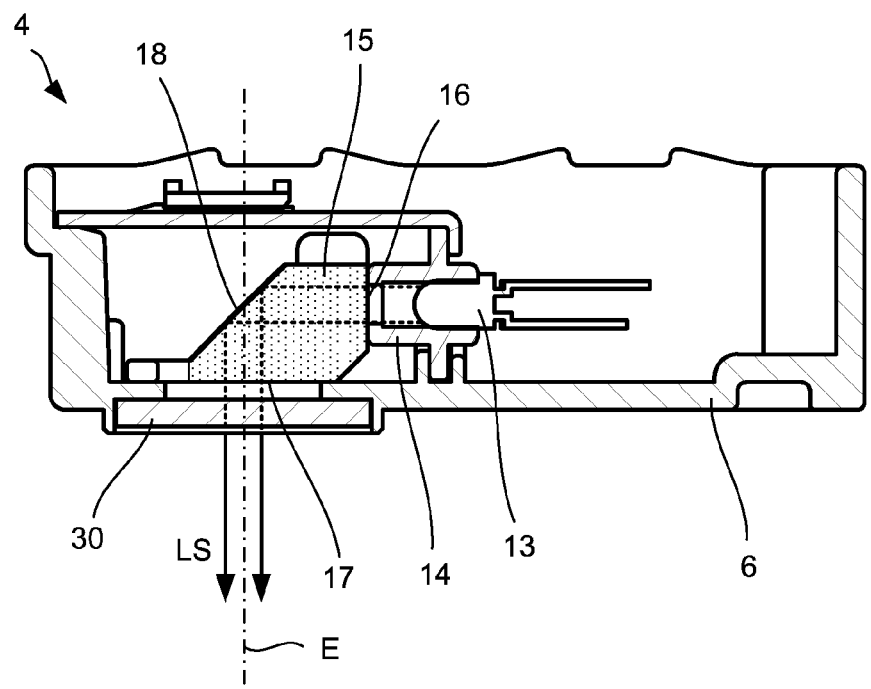
FIG. 5 shows a sectional view of the transmitting unit having light-emitting diodes and a reflector element.

FIG. 5 shows a sectional view of the transmitting unit 4 with light-emitting diodes 13 and a reflector element 15.

The light beams LS are emitted from the light-emitting diodes 13 transversely to the receiving axis E of the receiving unit 5 and are bundled via the perforated screens 14 and subsequently guided via the entry surface 16 into the reflector element 15 and deflected at an angle of 90° to the exit surface 17 via its reflection surface 18 by total reflection. In this case, the reflector element 15 is embodied in the form of a prism as a rectangular triangle, in which the entry surface 16 and exit surface 17 are perpendicular to one another, and the third inclined surface is formed by the reflection surface 18.

Figure 6:
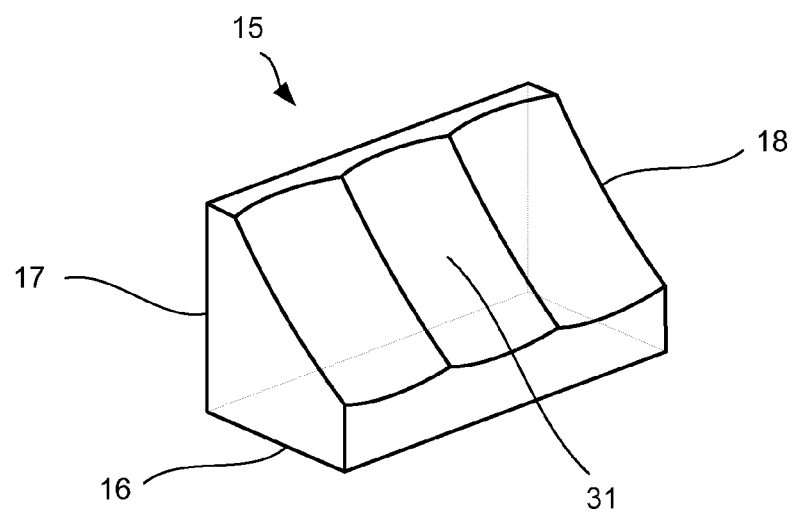
FIG. 6 shows an isometric view of the reflector element with the reflection surface.

FIG. 6 shows an isometric view of the reflector element 15 with the reflection surface 18.

The reflection surface 18 of the reflector element 17 has three convex bulges 31, which are each situated in front of one of the three light-emitting diodes 13. Because of this bulging wall of the reflection surface 18, the light beams LS are guided in parallel during the total reflection.

Figure 7:
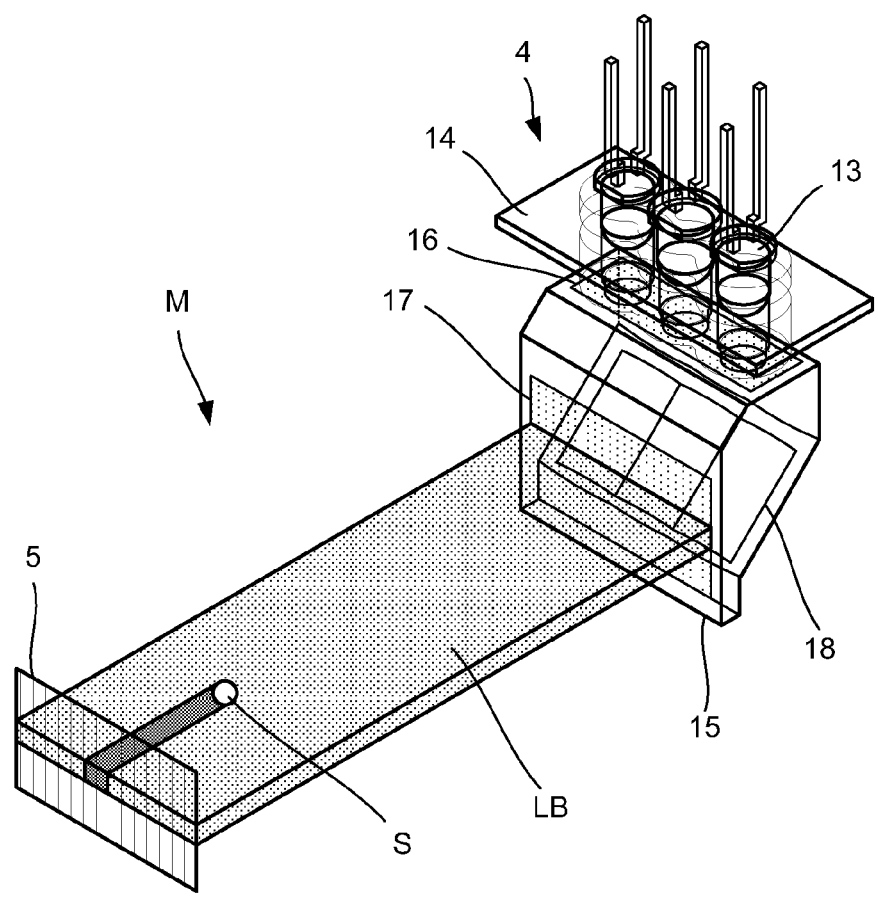
FIG. 7 shows an isometric view of the transmitting unit with illuminated band in the measurement field.

FIG. 7 shows an isometric view of the transmitting unit 4 with light band LB in the measurement field M.

As described in detail in FIG. 5, light beams LS are emitted from the preferably three light-emitting diodes 13, which are deflected by means of the perforated screens 14 and the reflector element 15 to form a light band LB of light beams LS aligned in parallel, so that it completely illuminates the entire downpipe interior 2 with intensity of approximately equal strength in the measurement field M and enters the receiving unit 5.

A grain S falling through the measurement field M causes a beam shading zone and therefore shading on the line element 11 of the receiving unit 5.

Figure 8:
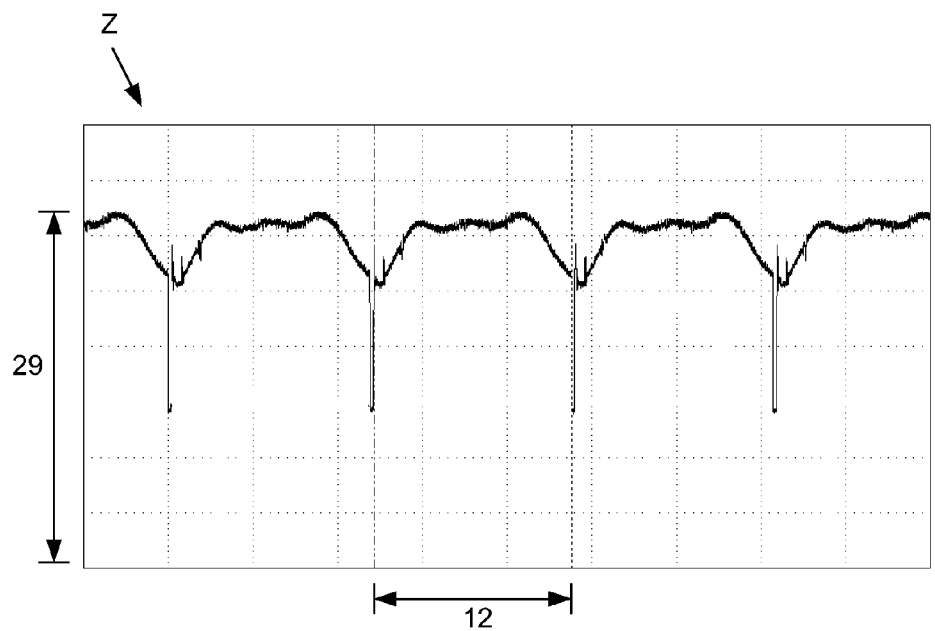
FIG. 8 shows the analog reception signal of a non-shaded line.

FIG. 8 shows the analog reception signal of a non-shaded line Z.

In this case, the line element 11 of the receiving unit 5 is approximately completely illuminated and the receiving elements 12 of the line element 11 reach their saturation level 29 in the event of full modulation.

Figure 9:
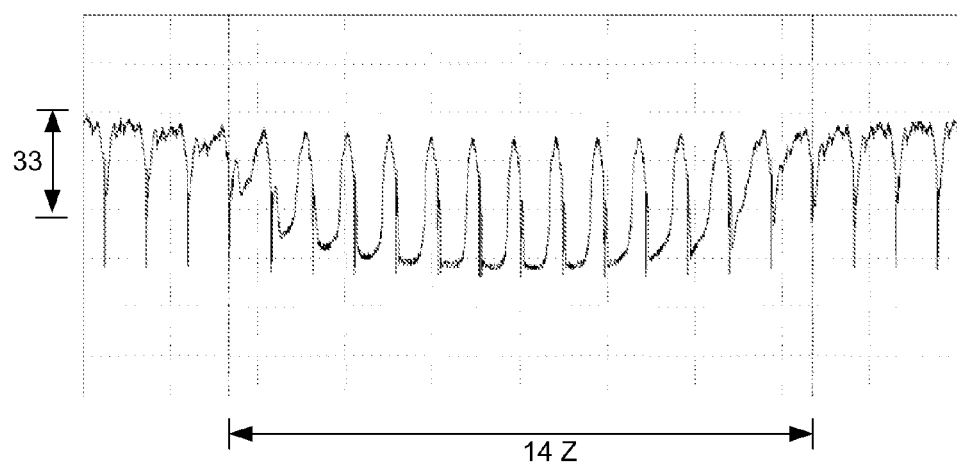
FIG. 9 shows the analog reception signal of a line in the measurement phase for a corn grain.

FIG. 9 shows the analog reception signal of a line Z, while a corn grain passes through the measurement field M.

In this case, at the middle 14 scanned lines Z, the values fall below the threshold values 33 of the corresponding receiving elements 12 because of the shading by the corn grain.

Figure 10:
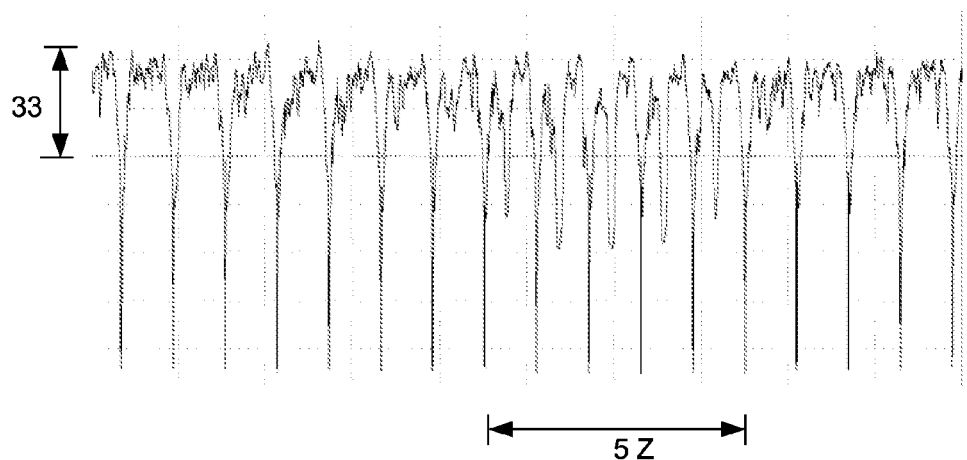
FIG. 10 shows the analog reception signal of a line in the measurement phase for a rapeseed grain in the trickling dirt.

FIG. 10 shows the analog reception signal of a line Z, while a rapeseed grain in the trickling dirt passes through the measurement field M.

In this case, in the middle 5 scanned lines Z, the values fall below the threshold values 33 of the corresponding receiving elements 12 to a lesser extent, because of the simultaneous shading by the rapeseed grain S and also by the dirt particles. Nonetheless, the rapeseed grain S can be clearly differentiated from the dirt.

Figure 11:
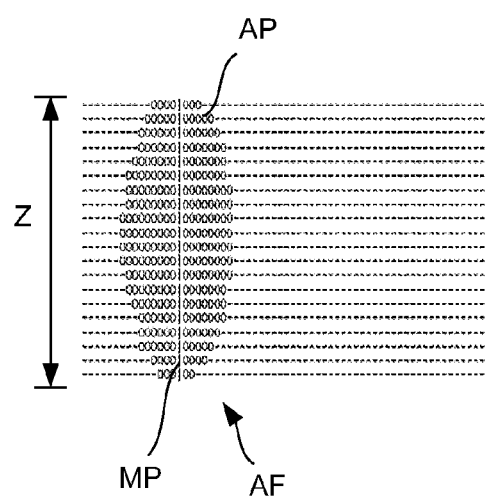
FIG. 11 shows the digital reception signals of multiple lines for a beet seed.

FIG. 11 shows the digital reception signals of multiple lines Z for a beet seed.

In this case, the shaded area AF is illustrated over 19 successive lines Z scanned by the receiving unit 5. In each line Z, the shaded receiving elements 12 or shaded points AP are marked by a "0" sign and the calculated center points MP are marked by a "|" sign. The beet seed can be recognized both on the basis of the length and width of the shaded area AF and also on the basis of the linearly extending center points MP in the shaded area AF.

Figure 12:
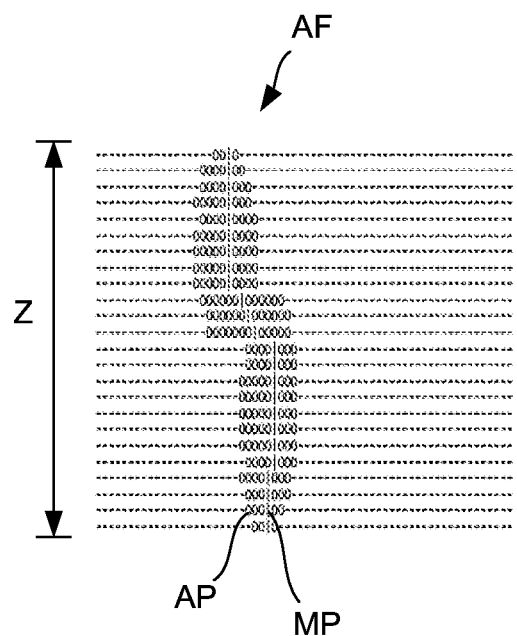
FIG. 12 shows the digital reception signals of multiple lines for a double hit of two rapeseed grains.

FIG. 12 shows the digital reception signals of multiple lines Z for a double hit of two rapeseed grains.

In this case, the shaded area AF is illustrated over 30 successive lines Z scanned by the receiving unit 5. Although the shaded area AF is nearly twice as long as that of a single grain, nonetheless, two directly successive rapeseed grains can be recognized because of the shift of the center points MP in the middle lines Z.

Figure 13:
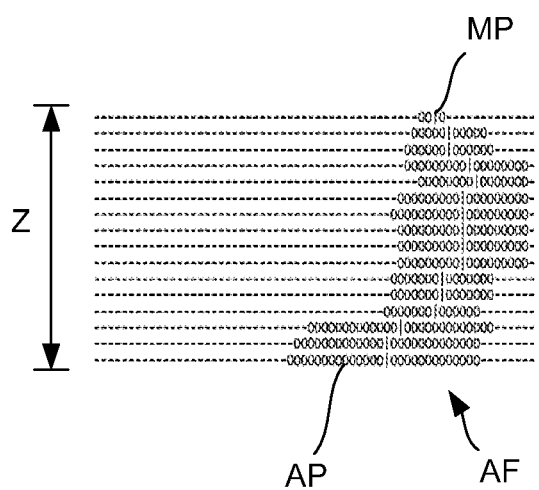
FIG. 13 shows the digital reception signals of multiple lines for the scanning of dirt.

FIG. 13 shows the digital reception signals of multiple lines Z for the scanning of dirt.

In this case, the shaded area AF is illustrated over 15 successive lines Z scanned by the receiving unit 5. In this case, the shaded area AF does not correspond to the length or the width of a seed grain and, in addition, multiple shifts of the center points MP in the shaded area AF can be recognized. As a result, this scanning is evaluated as dirt particles.

Once more in brief summary: A downpipe sensor 1 for single grain recognition of grains S in a downpipe 2 having a predefined measurement field M, on which a transmitting unit 4 and a receiving unit 5 are arranged at a distance to one another, wherein the light beams LS emitted by the transmitting unit 4 are guided in the case of free beam path through the downpipe interior 2 to the receiving unit 5 and are at least partially attenuated during a passage of a grain S, and in which the receiving unit 5 is formed by a line element 11 having a predefined number of receiving elements 12.

In this case, the transmitting unit 4 comprises one or more light-emitting diodes 13, which are arranged in a line, with perforated screens 14 and a reflector element 15 in the form of a prism, which is embodied as a right triangle, in which the two surfaces perpendicular to one another form an entry surface 16 and an exit surface 17 and the third surface forms a reflection surface 18, and the light beams LS are emitted from the light-emitting diodes 13 transversely to a receiving axis E of the receiving unit 5 and are bundled via the perforated screens 14 and are subsequently guided into the reflector element 15 via the entry surface 16 and are deflected by total reflection toward the exit surface 17 via its reflection surface 18 to form a light band LB of light beams LS aligned in parallel, so that the light band LB in the measurement field M completely illuminates the entire downpipe interior 2 with intensity of approximately equal strength and enters the receiving unit 5 in parallel to the receiving axis E thereof, wherein the entire width of the downpipe interior 2 and therefore the light band LB is continuously detected via its line element 11, and means are provided for recognizing areas of grains S arranged in the light band LB.

The following is a summary list of reference numerals and the corresponding structure used in the above description of the invention:

1 downpipe sensor
2 downpipe
4 transmitting unit
5 receiving unit
6 first housing element
7 second housing element
8 fastening strap
9 first opening
10 second opening
11 line element
12 receiving element
13 light-emitting diode
14 perforated screen
15 reflector element
16 entry surface
17 exit surface
18 reflection surface
19 analysis unit
20 A/D converter
21 memory
22 microcontroller
23 interface
24 voltage supply
25 line element controller
26 light-emitting diode driver
27 reception signal
28 analysis signal
29 saturation level
30 protective disk
31 bulge
32 supply of transmitting unit
33 threshold value
AF shaded area
AP shaded point
E receiving axis
LB light band
LS light beam
M measurement field
MP center point
S grain, seed grain
Z line

The invention claimed is:

1. A downpipe sensor system for single grain recognition of grains in a downpipe, the sensor system comprising:
   a transmitting unit and a receiving unit disposed at a spacing distance from one another and spanning a predefined measurement field in a downpipe interior, wherein light beams emitted by said transmitting unit traverse said downpipe interior to said receiving unit and the light beams are at least partially attenuated during a passage of a grain through the measurement field;
   said receiving unit having a receiving axis and being formed by a line element having a predefined number of receiving elements;
   said transmitting unit having one or more light-emitting diodes disposed in a line and a reflector element having an entry surface, an exit surface for the light beams, and a third surface being a reflection surface with a bulging wall for parallelization and total reflection of the light beams;
   wherein the light beams are emitted from said light-emitting diodes transversely to said receiving axis of said receiving unit and are subsequently guided into said reflector element via said entry surface, and are deflected by total reflection toward said exit surface via said reflection surface to form a light band of mutually parallel light beams, with said light band in said measurement field completely illuminating an entire said downpipe interior with an intensity of approximately even strength and entering said receiving unit parallel with said receiving axis thereof; and
   wherein an entire width of said downpipe interior and an entire width of said light band is continuously monitored via said line element during operation; and
   means connected to said receiving unit for recognizing areas of grains arranged in the light band;
   said transmitting unit being disposed in a first housing and said receiving unit being disposed in a second housing attached on opposite sides of the measurement field in respective first and second transparent openings of said downpipe along said receiving axis, said transmitting unit and said receiving unit each having a respective protective disk closing off a corresponding one of said transparent openings, said protective disk being smoothly aligned with said downpipe interior for preventing dirt accumulations.

2. The downpipe sensor system according to claim 1, wherein said reflection surface is formed with multiple convex bulges situated in front of a light-emitting diode, so that the light beams are guided in parallel.

3. The downpipe sensor system according to claim 1, wherein said reflector element is formed of a transparent plastic (polymethyl methacrylate, acrylic glass).

4. The downpipe sensor system according to claim 1, wherein said means for recognizing areas of grains comprise at least one analysis unit for analyzing the analog reception signals at an output of said receiving unit.

5. The downpipe sensor system according to claim 4, wherein said at least one analysis unit comprises at least one A/D converter for digitizing the analog reception signal, a memory for storing multiple scanned lines and for storing predefined reference values, a microcontroller for evaluating the stored lines based on the stored reference values, an interface for receiving new or changed reference values and for outputting an analysis signal of said microcontroller, and a light-emitting diode driver for adjusting a current of said light-emitting diodes via a supply line.

6. The downpipe sensor system according to claim 1, wherein said light-emitting diodes are configured to generate light beams of a wavelength in the spectral range between 550 nm and 1100 nm.

7. The downpipe sensor system according to claim 1, wherein said line element of said receiving unit is an optical line sensor implemented as a p-type intrinsic n-type diode line element, a charge-coupled device line element, or a complimentary metal-oxide-semiconductor line element.

8. The downpipe sensor system according to claim 7, wherein said line sensor has a resolution greater than 50 dpi, to ensure that relatively small seed grains may be recognized and differentiated from dirt particles.

9. The downpipe sensor system according to claim 7, wherein said line sensor is clocked at a cycle frequency of greater than 1 MHz to thereby scan relatively small seed grains multiple times at a very high fall speed.

10. A downpipe sensor system for single grain recognition of grains in a downpipe, the sensor system comprising:
a transmitting unit and a receiving unit disposed at a spacing distance from one another and spanning a predefined measurement field in a downpipe interior, wherein light beams emitted by said transmitting unit traverse said downpipe interior to said receiving unit and the light beams are at least partially attenuated during a passage of a grain through the measurement field;
said receiving unit having a receiving axis and being formed by a line element having a predefined number of receiving elements;
said transmitting unit having one or more light-emitting diodes with perforated screens arranged in a line and a reflector element being a prism formed as a right triangle having two mutually perpendicular surfaces forming an entry surface and an exit surface, respectively, and a third surface forming a reflection surface;
wherein the light beams are emitted from said light-emitting diodes transversely to said receiving axis of said receiving unit, are bundled via said perforated screens, are subsequently guided into said reflector element via said entry surface, and are deflected by total reflection toward said exit surface via said reflection surface to form a light band of mutually parallel light beams, with said light band in said measurement field completely illuminating an entire said downpipe interior with an intensity of approximately even strength and entering said receiving unit parallel with said receiving axis thereof; and
wherein an entire width of said downpipe interior and an entire width of said light band is continuously monitored via said line element during operation; and
means connected to said receiving unit for recognizing areas of grains arranged in the light band.

11. A downpipe sensor system for single grain recognition of grains in a downpipe, the sensor system comprising:
a transmitting unit and a receiving unit disposed at a spacing distance from one another and spanning a predefined measurement field in a downpipe interior, wherein light beams emitted by said transmitting unit traverse said downpipe interior to said receiving unit and the light beams are at least partially attenuated during a passage of a grain through the measurement field;
said receiving unit having a receiving axis and being formed by a line element having a predefined number of receiving elements;
said transmitting unit having one or more light-emitting diodes disposed in a line and a reflector element having an entry surface, an exit surface for the light beams, and a third surface being a reflection surface;
wherein the light beams are emitted from said light-emitting diodes transversely to said receiving axis of said receiving unit and are subsequently guided into said reflector element via said entry surface, and are deflected by total reflection toward said exit surface via said reflection surface to form a light band of mutually parallel light beams, with said light band in said measurement field completely illuminating an entire said downpipe interior with an intensity of approximately even strength and entering said receiving unit parallel with said receiving axis thereof; and
wherein an entire width of said downpipe interior and an entire width of said light band is continuously monitored via said line element during operation; and
means connected to said receiving unit for recognizing areas of grains arranged in the light band.

12. A method for single grain recognition in a downpipe, the method which comprises:
providing a downpipe sensor system according to claim 1 and carrying out the following step:
(i) illuminating the measurement field by the light band of the transmitting unit;
(ii) cyclically scanning successive lines by way of the receiving unit;
(iii) delivering individual grains in the downpipe through the predefined measurement field;
(iv) interrupting the light band by way of a grain or a dirt particle;
(v) storing the currently scanned line values in the memory;
(vi) analyzing the currently scanned line values to ascertain shaded points during a passage of the grain per line;
(vii) forming the center point of the shaded points per line;
(viii) ascertaining the area of shaded points over multiple lines;
(ix) evaluating the shaded area by comparing with stored reference values of the grains by way of the microcontroller;
(x) recognizing individual grains on a basis of a result of the evaluating step;
(xi) blanking out dirt particles and foreign grains; and
(xii) outputting an analysis signal containing items of information about recognized grains via the interface; and
determining a time span between two successively recognized grains in the downpipe.

13. The method for single grain recognition according to claim 12, wherein the reference values comprise values for a length, a width, and an offset from center points of the grains and the reference values are stored in a memory.

14. The method for single grain recognition according to claim 13, which comprises setting the downpipe sensor system to seed grains of different shapes selected from the group consisting of corn, sunflowers, wheat, soybeans, beets, and rapeseed by storing different reference values in the memory.

15. The method for single grain recognition according to claim 14, which comprises transmitting new or changed reference values from an application or selecting different reference values via an interface.

16. The method for single grain recognition according to claim 12, which comprises controlling an intensity of the light beams by way of a light-emitting diode driver, so as to compensate for a soiling of the protective disks covering the transparent openings in the downpipe for the transmitting unit and the receiving unit.

17. A agricultural monitoring method, comprising:
providing a downpipe sensor system according to claim 1 in an agricultural machine;
delivering agricultural materials in a product stream of grains through a downpipe of the agricultural machine; and
monitoring and detecting single grains in the downpipe with the downpipe sensor system.

18. The method according to claim 17, wherein the agricultural machine is an air seeder, and the delivering step comprises depositing single seed grains through the downpipe for sowing in the ground.

19. The method according to claim 17, wherein the agricultural machine is a pneumatic or mechanical seeder or a fertilizer distributor.

20. The method according to claim 17, wherein the downpipe sensor system is integrated via an interface in a control system of the agricultural machine for at least one of monitoring or displaying an isolation quality, for diagnostic purposes and update operations.

21. The method according to claim 20, wherein the downpipe sensor system is incorporated into a control system for controlling or closed-loop controlling of a metering or an isolation of the grains on the basis of a predefined depositing pattern.

* * * * *